US008788196B1

(12) United States Patent
Kennedy (10) Patent No.: US 8,788,196 B1
(45) Date of Patent: Jul. 22, 2014

(54) PRESENTATION OF A VEHICLE ON A CHART

(75) Inventor: Brian B. Kennedy, Portland, OR (US)

(73) Assignee: The Boeing Company, Chicago, IL (US)

( * ) Notice: Subject to any disclaimer, the term of this patent is extended or adjusted under 35 U.S.C. 154(b) by 1044 days.

(21) Appl. No.: 12/619,411

(22) Filed: Nov. 16, 2009

(51) Int. Cl.
| G06F 17/00 | (2006.01) |
| G06F 19/00 | (2011.01) |
| G01C 21/00 | (2006.01) |
| G08G 5/00 | (2006.01) |
| G01C 23/00 | (2006.01) |

(52) U.S. Cl.
USPC ........... 701/431; 701/442; 701/455; 701/467; 701/528; 701/300; 340/995.15; 340/995.27

(58) Field of Classification Search
USPC ............. 701/1, 400, 408, 409, 410, 411, 412, 701/417, 418, 425, 426, 428, 431, 432, 442, 701/445, 454, 455, 457, 459, 466, 467, 468, 701/487, 492, 528, 532, 538, 300; 340/990, 340/995.1, 995.11, 995.14, 995.15, 995.16, 340/995.17, 995.19, 995.27
See application file for complete search history.

(56) References Cited

U.S. PATENT DOCUMENTS

| 4,590,569 | A | * | 5/1986 | Rogoff et al. ................. 701/454 |
| 4,862,374 | A | * | 8/1989 | Ziemann ....................... 701/455 |
| 5,815,118 | A | * | 9/1998 | Schipper ........................ 342/451 |
| 5,978,000 | A | * | 11/1999 | Levine .............................. 346/62 |
| 6,449,556 | B1 | * | 9/2002 | Pauly ............................ 701/467 |
| 6,519,527 | B2 | * | 2/2003 | Shinagawa .................... 701/411 |
| 6,816,780 | B2 | * | 11/2004 | Naimer et al. ................ 701/467 |
| 7,433,779 | B2 | * | 10/2008 | Deker et al. .................. 701/122 |
| 2005/0288831 | A1 | | 12/2005 | Lusardi et al. |
| 2007/0168120 | A1 | | 7/2007 | Vandenbergh et al. |
| 2011/0010082 | A1 | * | 1/2011 | Wilson et al. ................. 701/200 |

OTHER PUBLICATIONS

"Goodbye paper, hello Flite-Deck", Plane and Pilot, Oct. 1, 2000, 1 page.
Chandra et al., "Human Factors considerations in the Design and Evaluation of Electronic Flight Bags (EFBs), Version 2", Sep. 2003, Office of Aviation Research, Washington DC, pp. 1-206.

* cited by examiner

Primary Examiner — Thomas Tarcza
Assistant Examiner — Edward Pipala
(74) Attorney, Agent, or Firm — Yee & Associates, P.C.

(57) ABSTRACT

The different advantageous embodiments provide a method, computer program product, and apparatus for presenting a position of a vehicle on a chart. In one advantageous embodiment, a method for presenting a vehicle on a chart is presented. A current position of the vehicle is identified. The method then determines whether the current position of the vehicle is on a path between two points in a plurality of points. A first indicator at a first location on the chart indicating a position of the vehicle on the path relative to the two points is presented responsive to a determination that the current position is on the path. A second indicator on a second location on the chart is presented responsive to an absence of a determination that the current position is on the path, wherein the second indicator points to a closest point in the plurality of points.

18 Claims, 8 Drawing Sheets

PRESENTATION OF A VEHICLE ON A CHART

BACKGROUND INFORMATION

1. Field

The present disclosure relates generally to navigation and in particular to a method and apparatus of presenting navigation information. Still more specifically the present disclosure relates to a method, apparatus, and computer program product for presenting a vehicle on a chart.

2. Background

Aircraft pilots frequently refer to charts while planning and executing a flight plan. Charts provide the pilots with aeronautical information used for flight planning or while flying an aircraft. This information includes, for example, the locations of runways, locations of waypoints, the radio frequencies in use at a given airport, weather patterns over a particular region, and potential hazards in a particular region. The information may also include routes or paths among airports, waypoints, and other navigational aids. For example, an airway may be approved by the Federal Aviation Administration or similar aviation authority.

As used herein, a chart is a document that contains navigational and procedural information for use while operating a vehicle. The procedural information may be instructions to be followed by the operator of the vehicle. In some examples, the procedural information is relevant to a particular point or area on the chart. As used herein, the terms chart and map are used interchangeably. Charts are generally designed to provide a viewer with quick access to relevant information. For example, the size and/or style of a font used for an airport code, a radio frequency or a warning may indicate the relevance of the airport, radio frequency or warning.

Information on a chart may be presented in a position on the chart at or near where the information is most relevant. For example, a radio frequency for an airport may be presented on the chart at or near the airport. In some cases, numerous pieces of information are relevant to areas that are separated by a small geographic distance.

One way numerous pieces of information are presented on a chart is by presenting the chart on a large scale. A chart with a large scale may present numerous pieces of information that are relevant to points that are separated by a small geographic distance because the points appear farther apart than on a chart presented on a small scale.

In some cases, a large geographic area is presented in a single chart. To keep the chart in a convenient size, the chart may be presented on a small scale. A chart with a small scale may present a large geographic area because each unit of measurement on the chart represents a greater geographic distance than each unit on a chart on a large scale.

Some charts are presented without a scale. A chart without a scale may present some portions of the chart in one scale, and other portions of the chart in another scale. A chart may be presented without a scale because a large scale is appropriate for some portions of the chart, while a small scale is appropriate for other portions of the chart. That is, a large scale for the entire chart would make the chart large such that the chart is inconvenient to use, but a small scale for the entire chart would reduce the level of detail and/or the amount of information that may be presented on the chart.

For example, a standard arrival chart (STAR) may cover a large number of square nautical miles. A standard arrival chart is a type of chart that provides information to a pilot for use when arriving at a particular location. For example, the pilot may use the information to follow an approach path and land at an airport.

Charts with a scale are commonly presented on electronic displays. The electronic display may be located within the vehicle. For example, the electronic display may be located in the cockpit of an aircraft. Charts presented electronically are referred to as electronic charts. In some examples, the electronic chart is combined with positional data for the vehicle to present a representation of the current location for the vehicle on the chart.

When an electronic chart does not have a scale applied consistently throughout the electronic chart and/or the electronic chart is presented using multiple scales, presenting positional data for the vehicle may be inappropriate. Presenting positional data for the vehicle may be inappropriate because a viewer of the electronic chart may not properly interpret the distance between the current position of the vehicle on the electronic chart and a point of interest on the electronic chart.

Thus, it would be advantageous to have a method and apparatus that takes into account one or more of the issues discussed above, as well as possibly other issues.

SUMMARY

In one advantageous embodiment, a method for presenting a vehicle on a chart is presented. A current position of the vehicle is identified. The method then determines whether the current position of the vehicle is on a path between two points in a plurality of points. A first indicator at a first location on the chart indicating a position of the vehicle on the path relative to the two points is presented responsive to a determination that the current position is on the path. A second indicator on a second location on the chart is presented responsive to an absence of a determination that the current position is on the path, wherein the second indicator points to a closest point in the plurality of points.

In another advantageous embodiment a computer program product for presenting a vehicle on a chart is presented. The computer program product comprises a computer readable storage medium. The computer readable storage medium includes program code, stored on the computer readable storage medium, for identifying a current position of the vehicle. The computer program product includes program code, stored on the computer readable storage medium, for determining whether the current position of the vehicle is on a path between two points in a plurality of points. The computer program product also includes program code, stored on the computer readable storage medium, for presenting a first indicator at a first location on the chart indicating a position of the vehicle on the path relative to the two points responsive to a determination that the current position is on the path. The computer program product also includes program code, stored on the computer readable storage medium, for presenting a second indicator on a second location on the chart, wherein the second indicator points to a closest point in the plurality of points responsive to an absence of a determination that the current position is on the path.

In yet another advantageous embodiment, an apparatus for presenting a vehicle on a chart is presented. The apparatus comprises a display device. The apparatus also comprises a processor unit connected to the display and configured to identify a current position of the vehicle, determine whether the current position of the vehicle is on a path between two points in a plurality of points, present, on the display, a first indicator at a first location on the chart indicating a position of the vehicle on the path relative to the two points responsive to a determination that the current position is on the path, and present on the display device a second indicator on a second location on the chart responsive to an absence of a determination that the current position is on the path, wherein the second indicator points to a closest point in the plurality of points.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
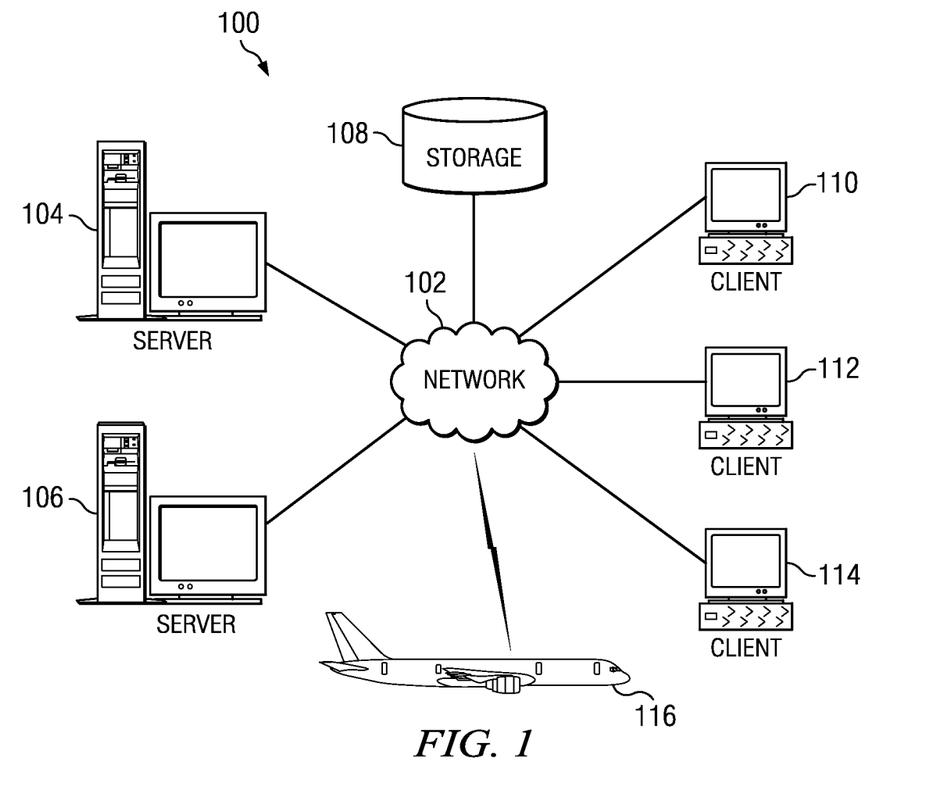
FIG. 1 is an illustration of a network of data processing systems in which an advantageous embodiment may be implemented.
Figure 2:
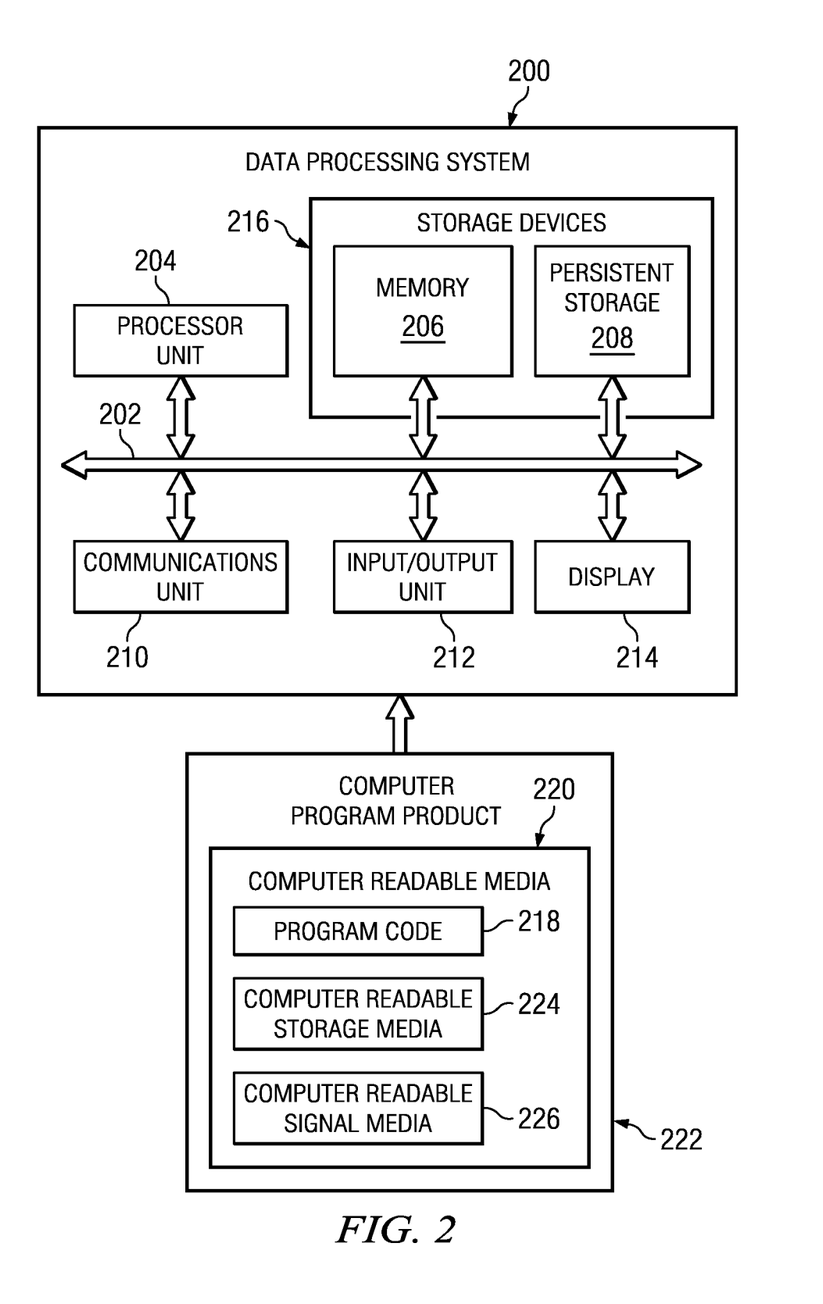
FIG. 2 is an illustration of a block diagram of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100.

Network 102 may include connections, such as wire, wireless communication links, or fiber optic cables. In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). As used herein "a number" when referring to items mean one or more items. For example, a number of different types of networks is one or more different types of networks.

FIG. 1 is intended as an example, and not as an architectural limitation for different embodiments. In the depicted example, a charting system may be present on aircraft 116. The charting system may be temporarily or permanently installed in aircraft 116. In some advantageous embodiments, chart information may be transmitted by client 110 and/or server 106. This chart information may be at least one of charts, chart updates, and other suitable information. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Chart information may be transmitted over network 102 and received by a charting system on aircraft 116. Client 110 may also cause server 106 to transmit chart information to the charting system on aircraft 116. In another advantageous embodiment, charts are retrieved over network 102 from server 106, storage 108, and/or client 110 by a charting system on aircraft 116.

Turning now to FIG. 2, a block diagram of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of different considerations. For example, the different advantageous embodiments recognize and take into account that charts may be presented without a scale or with multiple scales to provide relevant information to a vehicle operator, such as an aircraft pilot. The different advantageous embodiments recognize that presenting the position of a vehicle on a chart that is not presented to scale or with multiple scales may provide inconsistent display of information to the operator of the vehicle.

The different advantageous embodiments recognize and take in to account that the operator of a vehicle may have an inaccurate understanding of the current position of the aircraft when position information is shown on a chart that is not to scale or has multiple scales. For example, a pilot using a standard approach chart that is not presented to scale may not accurately evaluate the time to fly between points because the geographic areas represented by points on the approach chart may be closer or farther to the aircraft than the points appear.

The different advantageous embodiments recognize and take in to account that presenting an indicator for the position of the vehicle relative to the two points on a path when the vehicle is on the path aids in determining positional awareness. The different advantageous embodiments recognize that the operator of the vehicle may view the indicator on the chart to learn the position of the aircraft on the path relative to the two points on the path. That is, the different advantageous embodiments recognize that the operator of the vehicle may view the indicator on the chart to acquire positional awareness of the relative position of the vehicle on the path.

The different advantageous embodiments also recognize and take in to account that presenting a different indicator for the position of the vehicle at the point closest to the current position of the vehicle is convenient when the vehicle is not on a path. The operator of the vehicle may view the chart to learn a direction and distance to travel to reach the point on the chart closest to the current position of the vehicle.

Thus, the different advantageous embodiments provide a method, computer program product, and apparatus for presenting a position of a vehicle on a chart. In one advantageous embodiment, a method for presenting a vehicle on a chart is presented. A current position of the vehicle is identified. The method then determines whether the current position of the vehicle is on a path between two points in a plurality of points. A first indicator at a first location on the chart indicating a position of the vehicle on the path relative to the two points is presented responsive to a determination that the current position is on the path. A second indicator on a second location on the chart is presented responsive to an absence of a determination that the current position is on the path, wherein the second indicator points to a closest point in the plurality of points.

Figure 3:
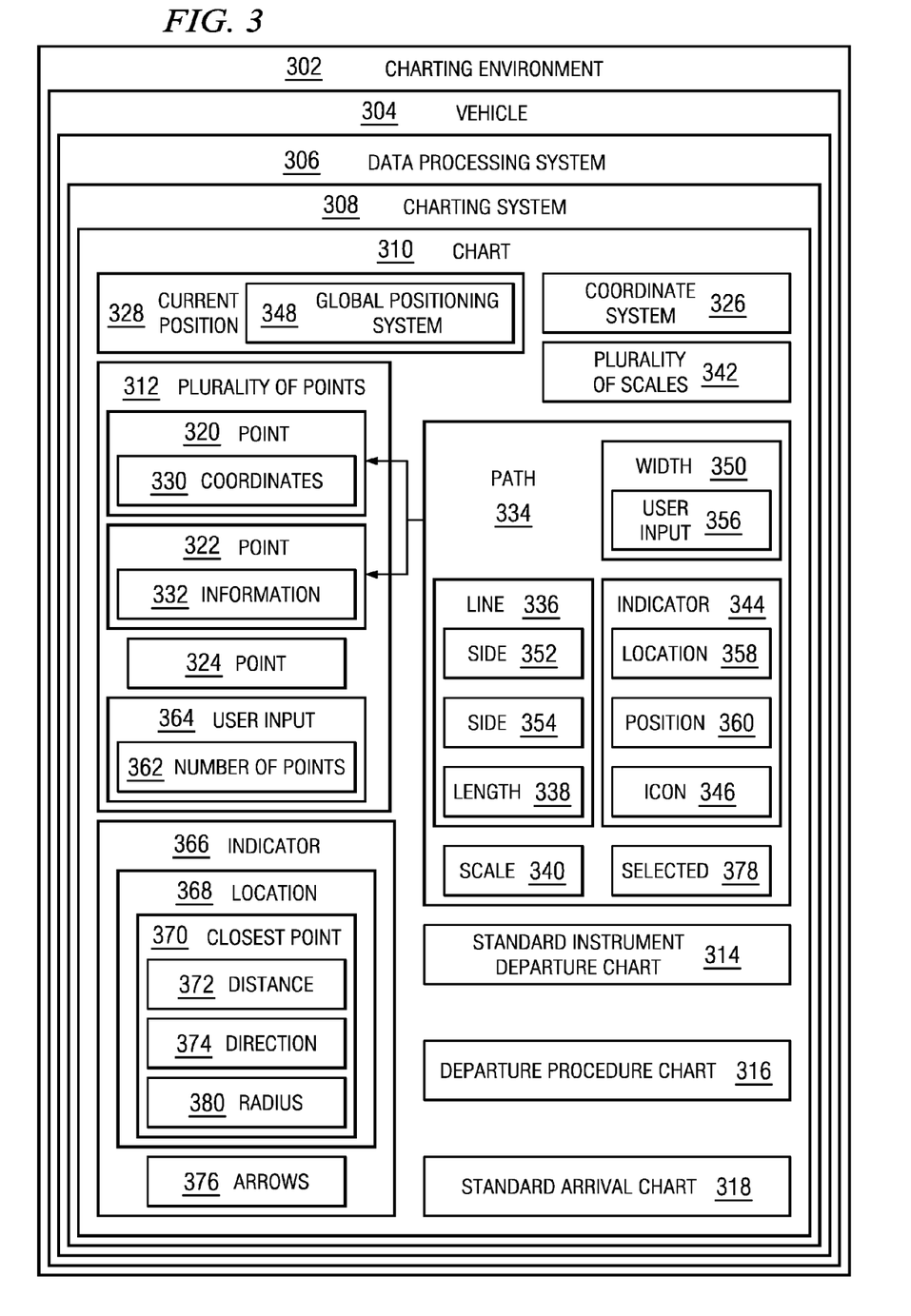
FIG. 3 is an illustration of a charting environment in accordance with an advantageous embodiment.

Turning now to FIG. 3, an illustration of a charting environment is depicted in accordance with an advantageous embodiment. Charting environment 302 may be implemented within network data processing system 100 in FIG. 1.

Vehicle 304 is present within charting environment 302. Vehicle 304 may be an aircraft, such as aircraft 116 from FIG. 1. Of course, vehicle 304 may be another vehicle. For example vehicle 304 may be an automobile, a ship, a train, a bus, a submarine, a spacecraft, a mobile platform, or any other suitable vehicle.

Vehicle 304 may contain data processing system 306. Data processing system 306 may be temporarily or permanently mounted in vehicle 304. Data processing system 306 may be a data processing system, such as data processing system 200 from FIG. 2.

Data processing system 306 may run charting system 308. For example, data processing system 306 may be an Electronic Flight Bag from Boeing Co. in Chicago, Ill. Charting system 308 presents chart 310. Charting system 308 may use a display device to present chart 310, such as display device 214 from FIG. 2. The display device may be a touchscreen display device.

Chart 310 is a chart of a geographic area. For example, chart 310 may contain plurality of points 312 representing navigational aids in the geographic area surrounding Dallas/Fort Worth International Airport. In some advantageous embodiments, chart 310 is standard instrument departure chart 314, a departure procedure chart 316, or standard arrival chart 318.

Chart 310 may be presented without a consistent scale. In other words, distances to different features or locations on chart 310 may not be to scale. In one advantageous embodiment, chart 310 is presented using a plurality of scales. For example, point 320 may be presented on chart 310 two inches from point 322. point 324 may also be presented two inches from point 322 in another direction. Because chart 310 is presented without a consistent scale, the geographic distance between the location represented by point 320 and the location represented by point 322 may be different than the geographic distance between the location represented by point 322 and the location represented by point 324.

Chart 310 may contain plurality of points 312. Plurality of points 312 may represent navigational aids on chart 310. Navigational aids are geographic locations relevant to the operation of vehicle 304. For example, plurality of points 312 may represent a number of airports, waypoints, runways, boundaries, or any other suitable point of interest. Plurality of points 312 may represent physical navigational aids, virtual navigational aids, or both. Physical navigational aids are navigational aids that have a physical presence. For example, a physical navigational aid may be a runway. A virtual navigational aid does not have a physical presence. For example, a virtual navigational aid may be a waypoint.

Chart 310 may be based on coordinate system 326. That is, plurality of points 312 and/or current position 328 of vehicle 304 may be presented at particular coordinates in coordinate system 326. In one advantageous embodiment, chart 310 may be divided into 100 units in a horizontal direction and 100 units in a vertical direction. In one example, the bottom left corner of chart 310 is represented by coordinates (0,0) in coordinate system 326. The top right corner of chart 310 is represented by coordinates (100,100). Of course, coordinate system 326 may be any suitable coordinate system of any number of units and beginning from any point on chart 310.

Point 320, point 322, and point 324 are points within plurality of points 312. Point 320, point 322, and point 324 are presented on chart 310. Of course, any number of points may be presented on chart 310. Point 320 has coordinates 330. In one advantageous embodiment, charting system 308 stores coordinates 330 for point 320 that include both coordinates in coordinate system 326 and coordinates in a latitude/longitude coordinate system. The latitude/latitude coordinates represent the geographic location represented by point 320. Point 322 and point 324 may each also be stored with coordinates 330.

Point 322 is presented with information 332. Information 332 is information presented on chart 310 along with point 322. Information 332 may be relevant information to the operation of vehicle 304. In one advantageous embodiment, vehicle 304 is an aircraft. In such an advantageous embodiment, information 332 may be a radio frequency to be used when vehicle 304 is at point 322, instructions to be followed when vehicle 304 reaches point 322, a warning, or any other suitable information. Point 320 and point 324 may also each have information 332 relevant to point 320 and point 324, respectively.

Two points in plurality of points 312 may be presented as connected by path 334. As depicted here, path 334 is presented connecting point 320 and point 322. Path 334 may represent an approved route for vehicle 304 to travel between point 320 and point 322. The route may be approved by an authority for the geographic area represented by chart 310. For example, the authority may be the Federal Aviation Administration.

Path 334 may be presented on chart 310 as line 336. Line 336 has length 338. Path 334 may be presented with scale 340. However, chart 310 may not be presented to scale 340. That is, path 334 may not be presented at the same scale 340 as another portion of chart 310. In some advantageous embodiments, chart 310 is presented in plurality of scales 342. For example, traveling one inch along path 334 on chart 310 may not represent traveling the same geographic distance as traveling one inch to the west of point 324 if chart 310 is not presented to scale 340 or to plurality of scales 342.

Charting system 308 may present indicator 344 for vehicle 304 on chart 310. Indicator 344 may be icon 346. Icon 346 may be an own ship indicator. Icon 346 can be used to indicate a direction or heading of vehicle 304 in addition to a location vehicle 304.

Charting system 308 may identify current position 328 of vehicle 304. Current position 328 may be obtained using global positioning system 348. Charting system 308 may then determine whether vehicle 304 is along path 334. Vehicle 304 is on path 334 if current position 328 is a geographic location covered by path 334. That is, vehicle 304 is on path 334 if current position 328 is a geographic location through which line 336 passes.

However, path 334 may also have width 350. Width 350 represents a particular geographic distance on side 352 or side 354 of line 336. Side 352 is the geographic area represented by extending width 350 distance in one direction perpendicular to line 336. Likewise, side 354 is the geographic area represented by extending width 350 distance in the opposite direction perpendicular to line 336. When vehicle 304 is within width 350 of path 334 on side 352 or side 354, vehicle 304 is also considered to be on path 334. Width 350 may be set by user input 356 or stored with chart 310 in data processing system 306. Charting system 308 may also generate a quantity for width 350 based on scale 340 of path 334.

If vehicle 304 is determined to be on path 334, vehicle 304 may be presented on chart 310 using indicator 344. Indicator 344 is presented at location 358 in the form of icon 346. Location 358 is selected to represent position 360 of vehicle 304 along path 334. That is, indicator 344 represents position 360 of vehicle 304 relative to point 320 and point 322.

In one advantageous embodiment, icon 346 is a "V". The "V" may point toward point 320 at the end of path 334, or the "V" may point the current direction being traveled by vehicle 304. For example, if vehicle 304 is traveling on a path that extends north from point 322 to point 320, and vehicle 304 is traveling northeast, the point of the "V" may point northeast. Of course, icon 346 may be another graphic. Icon 346 may be a graphic of an aircraft, automobile, boat, or any other suitable vehicle. Additionally, indicator 344 may be another type of indicator. For example, indicator 344 may be a text or numeric indicator, such as "A" or "1."

Indicator 344 may be presented with additional information, such as a remaining travel time to point 320 at the end of path 334. The remaining travel time may be calculated by charting system 308 based on the current travel speed of vehicle 304 and a distance to point 320 at the end of path 334.

For example, assume point 320 and point 322 are presented 5 inches apart on chart 310. Also assume point 322 represents a geographic location that is 100 nautical miles from the geographic location represented by point 320. Therefore, scale 340 is 1 inch on chart 310 per 25 nautical miles. In this example, vehicle 304 is traveling along path 334. Assume vehicle 304 is on path 334 traveling toward point 322. Also assume vehicle 304 has current position 328 of 25 nautical miles from point 322.

In this example, charting system 308 determines that current position 328 is on path 334. Charting system 308 then presents indicator 344 at location 358 indicating position 334. Location 358, in this example, is on path 334 and 1 inch from point 322.

In other advantageous embodiments, charting system 308 determines that vehicle 304 has current position 328 that is not on path 334. Vehicle 304 is not on path 334 when current position 328 is not in the geographic area identified by line 336 and/or within width 350 distance of the geographic area represented by line 336.

If vehicle 304 is not on any path 334 presented on chart 310, charting system 308 presents indicator 366. Indicator 366 is presented at location 368 on chart 310. Location 368 is a point 324 on chart 310. Location 368 may be a number of points 362. A user may identify number of points 362 in user input 364. Number of points 362 may also be identified based on a plan being executed by an operator of vehicle 304. For example, number of points 362 may be determined based on a flight plan being executed. Number of points 362 may be points to be navigated in executing the flight plan.

In another advantageous embodiment, location 368 is closest point 370. Charting system 308 determines closest point 370 using current position 328. Closest point 370 is the point 320 geographically closest to vehicle 304. Charting system 308 may also use coordinates 330 of each point 320 in plurality of points 312 with current position 328 to determine closest point 370.

Indicator 366 may also be presented with distance 372 between current position 328 and location 368. Indicator 366 may also be presented with direction 374 from current position 328 to location 368. Direction 374 is the direction vehicle 304 would travel to reach location 368. Indicator 366 may be arrow 376. Arrow 376 may be pointed in direction 374.

In some advantageous embodiments, a user may designate one or more of path 334 on chart 310 as selected 378. For example, a user may designate one or more of path 334 on a list as selected 378 or designate the paths on chart 310 using a touchscreen interface as selected 378. Alternatively, the one or more of path 334 may be designated as selected 378 by charting system 308 in accordance with a plan currently being executed by vehicle 304. For example, charting system 308 may designate one or more of path 334 that are to be traveled during the course of a flight plan being executed by a pilot as selected 378.

In such advantageous embodiments, charting system 308 determines whether current position 328 is in the geographic area represented by path 334. If vehicle 304 is determined to be on path 334, but path 334 is not selected 378, charting system 308 does not present indicator 344. Instead, charting system 308 disregards the determination that vehicle 304 is on path 334. Charting system 308 then presents indicator 366 at location 368. Location 368 may be closest point 370 or number of points 362. Number of points 362 may be received from user input 364 or identified by a plan being executed by an operator of vehicle 304.

In some advantageous embodiments, charting system 308 determines whether current position 328 of vehicle 304 is within radius 380 of location 368 prior to presenting indicator 366. Radius 380 represents a geographic distance around the geographic location represented by location 368. Radius 380 may be preset, stored by charting system 308, or entered by a user.

When vehicle 304 is within radius 380 of location 368, indicator 366 may be presented with a graphical element different from indicator 366 used when vehicle 304 is outside of radius 380. For example, indicator 366 may be an arrow and a numeric distance between current position 328 and location 368 when current position 328 is outside radius 380. On the other hand, indicator 366 may be a dot, a square, a star, a graphical representation of vehicle 304, or another suitable indicator when current position 328 is within radius 380.

The illustration of charting environment 302 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, charting system 308 may present any number of indicator 344 and/or indicator 362. In such an example, charting system 308 may present distance 372 and direction 374 to some or all of plurality of points 312. Additionally, charting system 308 may present multiple indicators 332.

For example, if charting system 308 determines that vehicle 304 may be on multiple paths 320, charting system 308 may present indicator 344 on each path 334. Alternatively, charting system 308 may present indicator 344 on path 334 closest to current position 328. That is, if charting system 308 determines that vehicle 304 is within width 350 of multiple paths 320, charting system 308 may present indicator 344 on path 334 with the least distance between current position 328 and line 336.

Charting system 308 may also present more than one chart 310 simultaneously. Each chart 310 may depict a different geographic area or contain different information 332. Vehicle 304 may be depicted on one, some, or all instances of chart 310.

Figure 4:
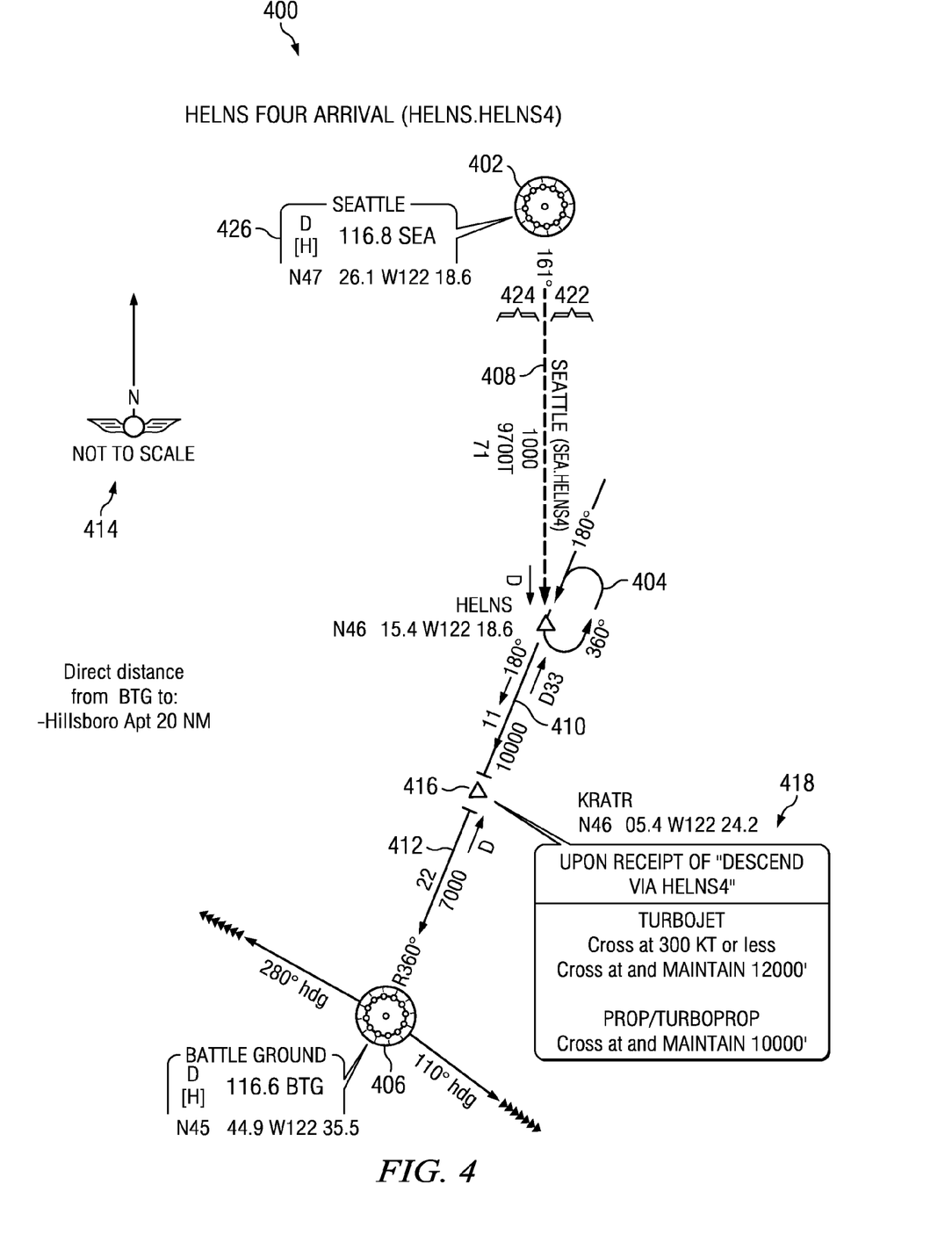
FIG. 4 is an illustration of a chart in accordance with an advantageous embodiment.
Figure 5:
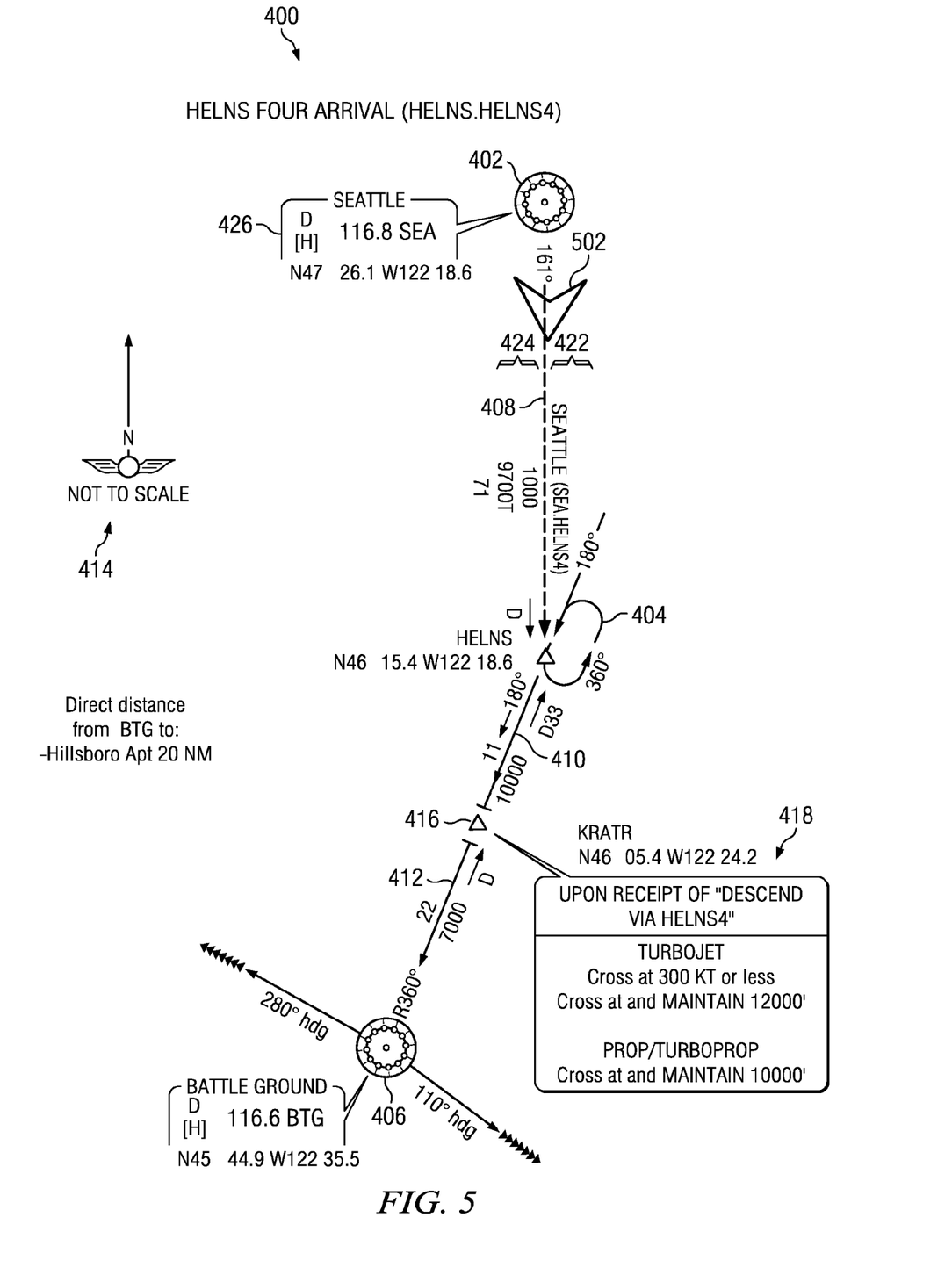
FIG. 5 is an illustration of a chart in which an aircraft is on a path in accordance with an advantageous embodiment.
Figure 6:
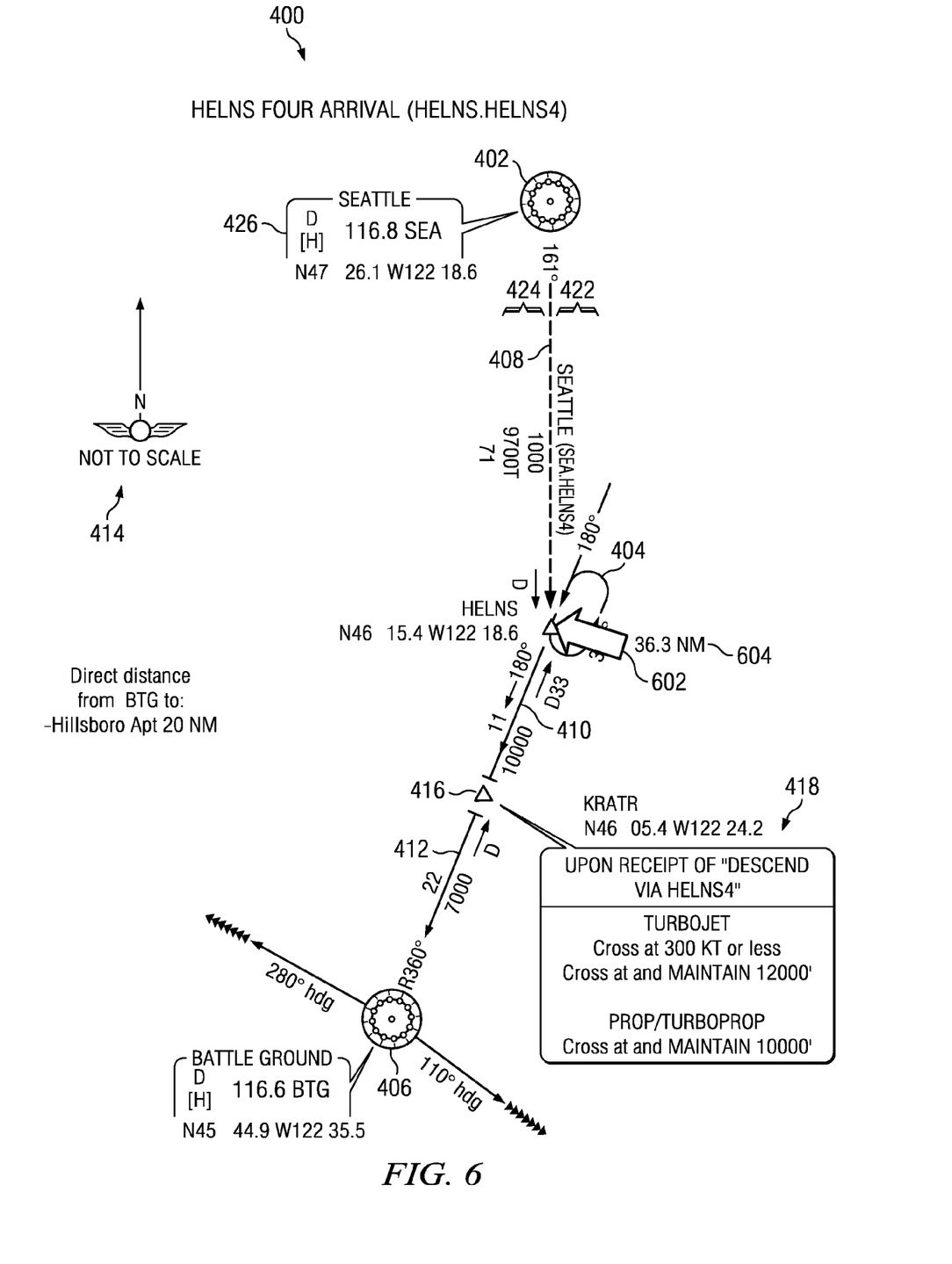
FIG. 6 is an illustration of a chart with an indicator representing the location of an aircraft as of the path in accordance with an advantageous embodiment.

FIG. 4, FIG. 5 and FIG. 6 depict an illustration of a chart and a number of indicators in accordance with an advantageous embodiment.

Turning now to FIG. 4, an illustration of a chart is depicted in accordance with an advantageous embodiment. Chart 400 may be an example of chart 310 from FIG. 3. Chart 400 may be presented by a charting system, such as charting system 308 from FIG. 3. In this example, chart 400 is a standard arrival chart, such as standard arrival chart 318 from FIG. 3. Specifically chart 400 presents a standard arrival chart for arrival at HELNS4 airport.

Chart 400 presents point 402, point 404 and point 406 and point 416. Point 402 is connected to point 404 via path 408. Likewise, point 416 is connected to point 406 via path 412. As depicted, point 402 represents a navigational aid, and point 404 represents a waypoint. Point 406 represents an additional navigational aid. In this advantageous embodiment, point 402 and point 406 represent very high frequency omnidirectional radio aids (VOR). Very high frequency omnidirectional radio aids are helpful to an operator of a vehicle in increasing positional awareness because the very high frequency omnidirectional radio aids are visible. Point 402, point 404 and point 406 and point 416 are examples of point 320 from FIG. 3. Point 404 is connected to point 416 via path 410. Path 408, path 410 and path 412 are examples of path 334 from FIG. 3.

Information 426 is associated with point 402. As depicted, information 426 is a radio frequency to be used when an aircraft is within an appointed distance of point 402. Information 426 is an example of information 332 from FIG. 3. Likewise, information 418 is associated with point 416. Information 418 provides information relevant to an operator of a vehicle traveling through point 416.

Information 418, in this example, is instructions to be followed by a pilot of an aircraft traveling at point 416. Chart 400 is not to scale 414 in these illustrative examples. Because chart 400 is not to scale 414, the length of path 408 may be different than the length of path 410. Likewise, the length of path 412 may be different from the length of path 410.

An aircraft may be considered to be traveling on path 408 if the position of the aircraft is in the geographic area represented by path 408. Additionally, an aircraft may be considered to be on path 408 if the position of the aircraft is in the geographic area represented by side 422 of path 408 or side 424 of 408.

Side 422 and side 424 are examples of side 352 and side 354 from FIG. 3. Side 422 and side 424 extend in a perpendicular direction from path 408 a particular distance. The distance extended by side 424 and side 426 are examples of width 350 in FIG. 3. In these advantageous embodiments, chart 400 is used in the navigation of an aircraft.

In some advantageous embodiments, some paths in chart 400 are designated as selected. The paths may be selected by a user or by a charting system in accordance with a plan currently being executed. In such advantageous embodiments, an aircraft which has a position in the geographic area represented by a path is considered to not be traveling on the path if the path is not selected.

For example, assume an aircraft has a current position between point 416 and point 406. If path 412 is not designated as selected, charting system will not consider the aircraft to be on path 412.

Turning now to FIG. 5, an illustration of a chart in which an aircraft is on a path is depicted in accordance with an advantageous embodiment. Indicator 502 is an indicator, such as indicator 344 in FIG. 3.

Indicator 502 is presented by a charting system, such as charting system 308 in FIG. 3, when the aircraft is in the geographic area represented by path 408. Indicator 502 is located at a position along path 408 between point 402 and point 404. The location at which indicator 502 is presented indicates the position of the aircraft represented by indicator 502 relative to point 402 and point 404. That is, indicator 502 is presented along path 408 such that the location of indicator 502 represents the relative distance traveled by the aircraft along path 408.

It should be noted that the aircraft represented by indicator 502 may be located in the geographic area represented by the line of path 408 or in the geographic area represented by side 424 or side 422.

Turning now to FIG. 6, an illustration of a chart with an indicator representing the location of an aircraft as off the path is depicted in accordance with an advantageous embodiment. Indicator 602 is an indicator, such as indicator 366 from FIG. 3.

Indicator 602 is presented by a charting system, such as charting system 308 in FIG. 3, when the aircraft represented by indicator 602 is determined to not be on a path within chart 400. Indicator 602 is presented because the current position of the aircraft represented by indicator 602 is not on a path. In this example, the aircraft is not on path 408, path 410, or 412.

Indicator 602 also indicates that the charting system presenting chart 400 has determined that the current position of the aircraft represented by indicator 602 is a direction of west southwest of point 404. That is, the aircraft represented by indicator 602 would reach point 404 if the aircraft traveled east northeast.

Indicator 602 also includes distance 604. Distance 604 identifies the distance between the current position of the aircraft represented by indicator 602 and point 404. In this example, the aircraft is about 36.3 nautical miles from point 404 in the direction indicated by indicator 602.

In other advantageous embodiments, the aircraft represented by indicator 602 is within a radius of point 404. In such advantageous embodiments, indicator 602 would be represented as a dot, a square, a star, a graphical representation of a vehicle, or another suitable indicator. The radius may be stored with chart 400 in a charting system or input by a user.

The illustration of chart 400 in FIGS. 4, 5 and 6 is not meant to imply physical or architectural limitations to the manner in which different advantageous embodiments may be implemented. Other elements in addition and/or in place of the ones illustrated may be used. Some elements may be unnecessary in some advantageous embodiments. Also the elements are presented to illustrate some functional components. One or more of these elements may be combined and/or divided into different elements when implanted in different advantageous embodiments.

For example, chart 400 may be a departure procedure chart or a standard instrument departure chart. Chart 400 may contain additional or fewer points, such as point 402, point 404, point 406 and point 416. Additionally, chart 400 may contain more or less information associated with the points. Indicator 502 and indicator 602 may be presented as any one or more of a dot, a square, a star, a graphical representation of a vehicle, or another suitable indicator. Indicator 502 and indicator 602 may also include a time to destination point, such as point 404 in FIG. 5.

Figure 7:
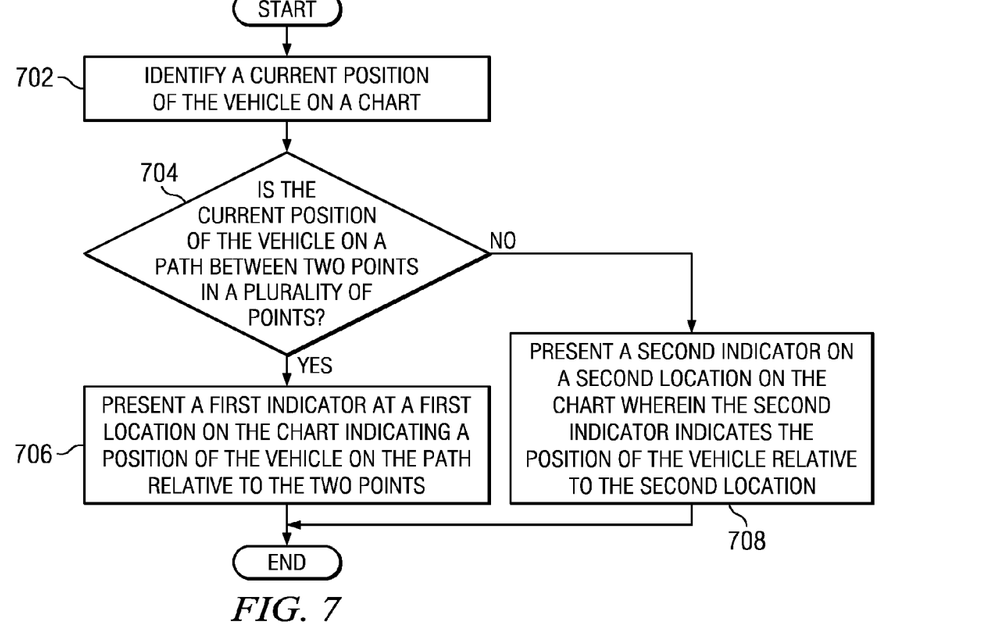
FIG. 7 is a flowchart of a process for presenting a vehicle on a chart in accordance with an advantageous embodiment.

Turning now to FIG. 7, a flowchart of the process for presenting a vehicle on a chart is depicted in accordance with an advantageous embodiment. In advantageous embodiments the process is implemented in data processing system 306. The process may be performed by charting system 308 in vehicle 304. The process begins by identifying a current position of the vehicle (operation 702). The process then determines whether the current position of the vehicle is on a path between two points in a plurality of points (operation 704). If the process determines that the current position of the vehicle is on a path between two points in a plurality of points, the process presents a first indicator at a first location on the chart indicating a position of the vehicle on the path relative to the two points (operation 706). The process terminates thereafter.

With reference again to operation 704, if the process determines that the current position of the vehicle is not on a path between two points in a plurality of points at operation 704, the process presents a second indicator on a second location on the chart wherein the second indicator indicates the position of the vehicle relative to a second location (operation 708). In one advantageous embodiment, the second location is the closest point to the current position of the vehicle. However, in another advantageous embodiment, the user inputs the second location by selecting a number of points in the plurality of points. The process terminates thereafter.

Figure 8:
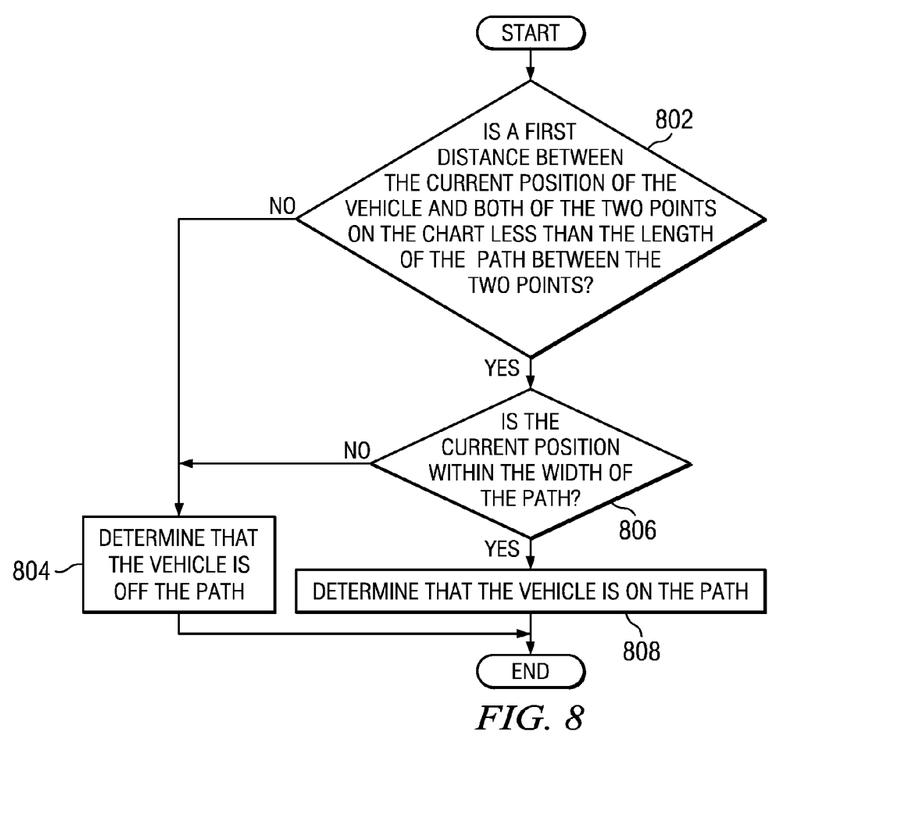
FIG. 8 is a flowchart of a process for determining whether the current position of the vehicle is on a path in accordance with an advantageous embodiment.

Turning now to FIG. 8, a flowchart of a process for determining whether the current position of the vehicle is on the path is depicted in accordance with an advantageous embodiment. In advantageous embodiments the process is implemented in data processing system 306. The process may be performed by charting system 308. The process may implement operation 704 in FIG. 7.

The process begins by determining whether the first distance between the current position of the vehicle and both of the two points on the chart is less than the length of the path between the two points (operation 802). If the process determines that the first distance between the current position of the vehicle and both of the two points on the chart is less than the length of the path between the two points, the process determines whether the current position is within the width of the path (operation 806). If the process determines that the current position is within the width of the path at operation 806, the process determines that the vehicle is on the path (operation 808).

If the process determines that the current position is not within the width of the path at operation 806, the process proceeds to operation 804. If the process determines that the first distance between the current position of the vehicle and both of the two points on the chart is not less than the length of the path between the two points at operation 802, the process determines that the vehicle is off the path (operation 804). The process terminates thereafter.

Figure 9:
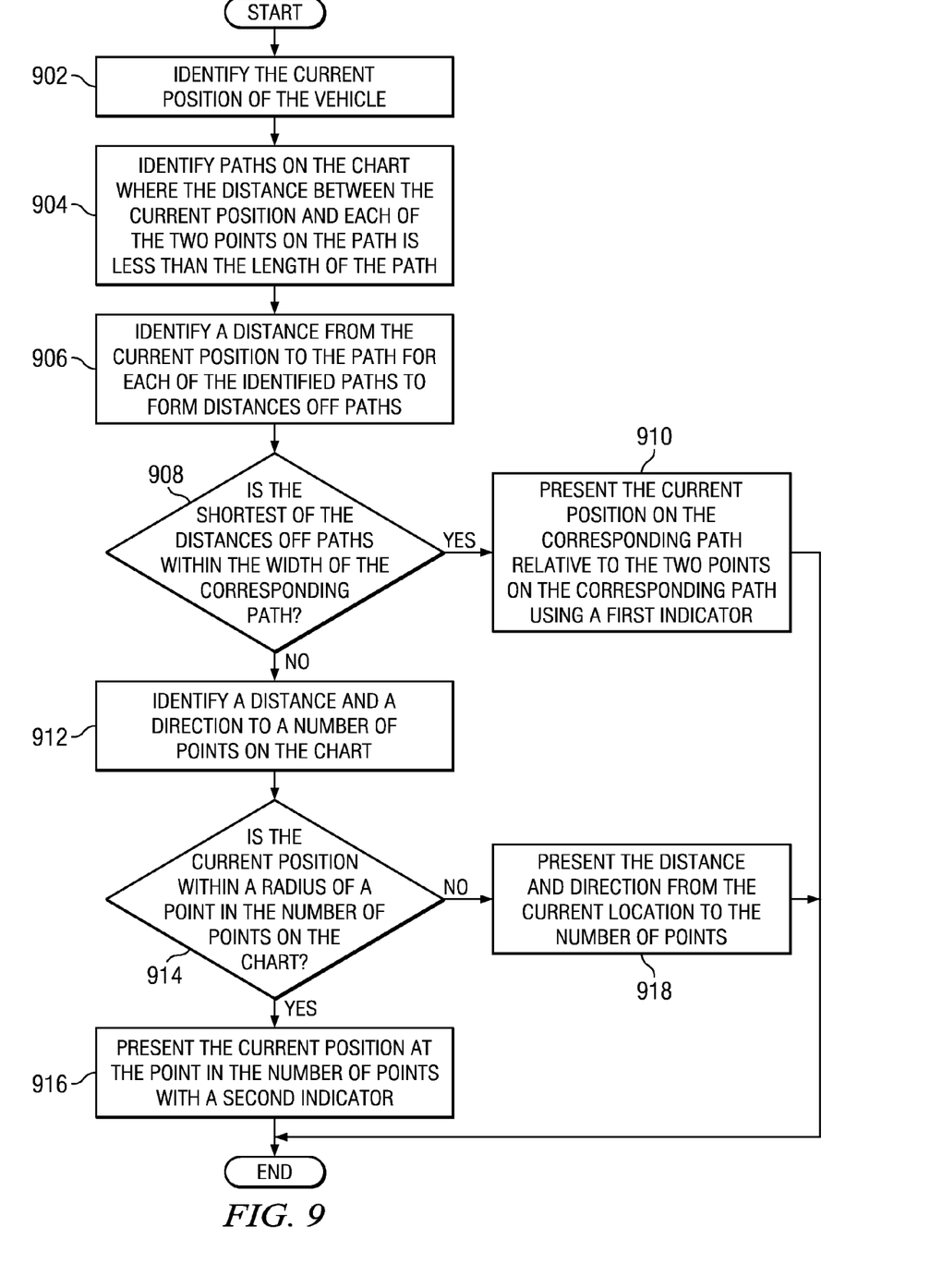
FIG. 9 depicts a flowchart of an additional process for presenting a vehicle on a chart in accordance with an advantageous embodiment.

Turning now to FIG. 9, a flowchart of an additional process for presenting a vehicle on a chart is depicted in accordance with an advantageous embodiment. In advantageous embodiments the process is implemented in data processing system 306. The process may be performed by charting system 308 in vehicle 304.

The process begins by identifying the current position of the vehicle (operation 902). The process then identifies paths on the chart where the distance between the current position and each of the two points on the path is less than the length of the path (operation 904).

The process then identifies a distance from the current position to the path for each of the identified paths to form distances off paths (operation 906). The process then determines whether the shortest of the distances off paths is within the width of the corresponding path (operation 908). If the process determines that the shortest of the distances off paths is within the width of the corresponding path, the process presents the current position on the corresponding path relative to the two points on the corresponding path using a first indicator (operation 910). The process terminates thereafter.

If the process determines that the shortest of the distances off paths is not within the width of the corresponding path at operation 908, the process then identifies a distance and a direction to a number of points on the chart (operation 912). The number of points may be selected based on a plan being executed by the operator of the vehicle and/or a user input. In another advantageous embodiment, the number of points is the closest point to the current location of the vehicle.

The process then determines whether the current position is within a radius of a point in the number of points on the chart (operation 914). If the process determines that the current position is within a radius of the point in the number of points on the chart, the process presents the current position at the point in the number of points with a second indicator (operation 916). The process terminates thereafter.

If the process determines that the current position is not within a radius of the closest point on the chart at operation 914, the process presents the distance and direction from the current location to the number of points (operation 918). The process terminates thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, the process in FIG. 9 may present the current position by pointing to multiple points on the chart with a distance and direction to each point at operation 918. The points may be points within a particular distance of the current position of the vehicle. Alternatively, the points may be points selected by the user or points up to a particular ranking in distance from the vehicle. For example, operation 918 may be performed with respect to the closest 3 points on the chart.

Additionally, the process in FIG. 9 may perform operation 910 with respect to multiple widths. That is, different paths may have different widths. For example, a path over an ocean may have a greater width than a path near a runway because there is more space in which to fly over the ocean.

Thus, the different advantageous embodiments allow an operator of a vehicle to obtain information about the vehicle on a chart that is not presented to scale or in multiple scales. The information may be in the form of an indicator. The indicator allows the operator of the vehicle to interpret positional data for the aircraft in a form that reduces confusion because the current position is presented in a manner relative to the navigational aids on the chart. Therefore, the operator obtains an accurate understanding of the current position of the aircraft, while also obtaining the information associated with the navigational aids.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for presenting a vehicle on a chart, the method comprising:
  identifying, using a processor, a current position of the vehicle;
  determining, using the processor, whether the current position of the vehicle is on a path between two points in a plurality of points;
  responsive to a determination that the current position is on the path, presenting, using the processor, a first indicator at a first location on the chart indicating a position of the vehicle on the path relative to the two points; and
  responsive to an absence of a determination that the current position is on the path, presenting, using the processor, a second indicator on a second location on the chart, wherein the second indicator indicates the position of the vehicle relative to the second location, wherein a scale varies throughout the chart.

2. The method of claim 1, wherein the second location is closer to the current position than the first location.

3. The method of claim 1, wherein the path between the two points comprises a line and a width on each side of the line.

4. The method of claim 3 further comprising:
  receiving a user input for the width.

5. The method of claim 3, wherein the step of determining, using the processor, whether the current position of the vehicle is on the path further comprises:
  determining, using the processor, whether a first distance between the current position of the vehicle and both of the two points is less than a length of the path;
  responsive, using the processor, to a determination that the distance is less than the length of the path, determining whether the current position is within the width of the path;

responsive to a determination that the current position is within the width of the path, determining, using the processor, that the current position of the vehicle is on the path; and responsive to an absence of a determination that the distance is less than the length of the path, determining, using the processor, that the current position of the vehicle is off the path.

6. The method of claim 1, wherein the step of identifying, using the processor, the current position of the vehicle is performed using a global positioning system.

7. The method of claim 1, wherein the step of presenting, using the processor, the second indicator on the second location on the chart further comprises:

identifying, using the processor, a distance and a direction from the current position to the second location, wherein the second indicator comprises an arrow identifying the direction and the distance from the current position to the second location.

8. The method of claim 1, wherein the second location on the chart is closer than the first location when the current position is within a radius of the second location.

9. The method of claim 1 further comprising:

receiving, using the processor, a user input comprising a number of points in the plurality of points, wherein the second location is the number of points.

10. The method of claim 1, wherein the path is a first path, and wherein the first path is presented on the chart on a different scale than a second path on the chart.

11. The method of claim 1, wherein the chart is selected from a standard instrument departure chart, a departure procedure chart, and a standard arrival chart.

12. The method of claim 1, wherein the vehicle is selected from an aircraft, an automobile, a surface ship, a submarine, and a spacecraft.

13. An apparatus comprising:

a display device; and a processor unit connected to the display and configured to identify a current position of a vehicle on a chart wherein a scale varies throughout the chart, determine whether the current position of the vehicle is on a path between two points in a plurality of points, present, on the display, a first indicator at a first location on the chart indicating a position of the vehicle on the path relative to the two points responsive to a determination that the current position is on the path, and present on the display device a second indicator on a second location on the chart responsive to an absence of a determination that the current position is on the path, wherein the second indicator indicates the position of the vehicle relative to the second location.

14. The apparatus of claim 13, wherein the processor unit is configured to present on the display device the second indicator on the second location on the chart further comprises:

the processor unit being configured to identify a distance and a direction from the current position to the second location, wherein the second indicator comprises an arrow identifying the direction and the distance from the current position to the second location.

15. The apparatus of claim 13 further comprising:

the vehicle, wherein the display and the processor unit are located inside the vehicle.

16. A non-transient computer program product comprising:

a computer readable storage medium;

program code, stored on the non-transient computer readable storage medium, for identifying a current position of a vehicle on a chart wherein a scale varies throughout the chart;

program code, stored on the non-transient computer readable storage medium, for determining whether the current position of the vehicle is on a path between two points in a plurality of points;

program code, stored on the non-transient computer readable storage medium, for presenting a first indicator at a first location on the chart indicating a position of the vehicle on the path relative to the two points responsive to a determination that the current position is on the path; and program code, stored on the non-transient computer readable storage medium, for presenting a second indicator on a second location on the chart, wherein the second indicator indicates the position of the vehicle relative to the second location responsive to an absence of a determination that the current position is on the path.

17. The non-transient computer program product of claim 16, wherein the path between the two points comprises a line and a width on each side of the line.

18. The non-transient computer program product of claim 17 further comprising:

receiving a user input for the width.

* * * * *